United States Patent
Jang et al.

(10) Patent No.: US 9,502,949 B2
(45) Date of Patent: Nov. 22, 2016

(54) STATOR OF MOTOR HAVING BUS-BAR WIRING STRUCTURE AND METHOD OF WIRING COIL IN PARALLEL USING THE SAME

(71) Applicant: NEW MOTECH CO., LTD., Gwangju (KR)

(72) Inventors: Jeong Cheol Jang, Gwangju (KR); Je Hyung Seo, Gwangju (KR); Woon Pil Jung, Sunchun-si (KR); Seung Jae Lee, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 245 days.

(21) Appl. No.: 14/490,678

(22) Filed: Sep. 19, 2014

(65) Prior Publication Data
US 2015/0137637 A1    May 21, 2015

(30) Foreign Application Priority Data
Nov. 20, 2013  (KR) .......................... 10-2013-0141079

(51) Int. Cl.
*H02K 3/52* (2006.01)
*H02K 15/095* (2006.01)

(52) U.S. Cl.
CPC ............ *H02K 15/095* (2013.01); *H02K 3/522* (2013.01); *H02K 2203/09* (2013.01); *Y10T 29/49012* (2015.01)

(58) Field of Classification Search
CPC .......... H02K 3/522; H02K 3/32; H02K 3/34; H02K 3/345; H02K 3/46; H02K 3/52; Y10T 29/49012

USPC ................................... 310/71, 179, 195–209
See application file for complete search history.

(56) References Cited

U.S. PATENT DOCUMENTS

| 2007/0278875 A1* | 12/2007 | Haga | H02K 3/522 |
| | | | 310/71 |
| 2010/0201213 A1* | 8/2010 | Kataoka | H02K 3/522 |
| | | | 310/71 |

FOREIGN PATENT DOCUMENTS

| JP | 5028869 B2 | 9/2012 | |
| JP | 2013-102596 A | 5/2013 | |
| JP | 2013102596 A | * 5/2013 | ............... H02K 3/52 |
| KR | 10-2008-0068437 A | 7/2008 | |
| KR | 10-2010-0046922 A | 5/2010 | |
| KR | 10-2010-0059548 A | 6/2010 | |
| KR | 10-1146440 B | 5/2012 | |
| KR | 10-1173757 B | 8/2012 | |

OTHER PUBLICATIONS

Machine translation of JP 2013102596 A (May 2013).*

* cited by examiner

*Primary Examiner* — Michael Andrews
(74) *Attorney, Agent, or Firm* — Revolution IP, PLLC

(57) ABSTRACT

A stator of a motor having a bus-bar wiring structure according to the present invention includes: a stator core configured of a core base in which a plurality of teeth is formed; an upper insulator coupled to a top of the stator core to insulate the teeth; a lower insulator coupled to a bottom of the stator core; a coil wound around the teeth when the upper insulator and the lower insulator are coupled; and a lower bus-bar housing coupled to a top of the upper insulator and having a plurality of bus-bar insertion units formed to insert a plurality of bus-bars.

4 Claims, 9 Drawing Sheets

STATOR OF MOTOR HAVING BUS-BAR WIRING STRUCTURE AND METHOD OF WIRING COIL IN PARALLEL USING THE SAME

CROSS REFERENCE TO PRIOR APPLICATIONS

This application claims priority under 35 U.S.C. §119 to Korean Patent Application No. KR 10-2013-0141079 filed on Nov. 20, 2013, which is hereby incorporated by reference in its entirety.

BACKGROUND OF THE INVENTION

Field of the Invention

The present invention relates to a motor. More particularly, the present invention relates to a structure applying a bus-bar in order to wire a coil wound around a stator in parallel and a method of winding the coil using the same.

Background of the Related Art

Generally, a motor or a generator is used by wiring a plurality of coils wound around a stator. Particularly, most of AC motors or generators wire the coils in parallel. In the case of such parallel wiring, since an end of a wound coil should be connected to each tooth of the stator, the number of coils to be wired is considerably large, and thus wiring methods more convenient and having good electrical characteristics while avoiding electrical interference with each phase are proposed.

Particularly, a structure applying a bus-bar to avoid electrical interference with other phases while connecting the same phase is frequently employed to wire the coils. Korean Laid-opened Patent Nos. 10-2008-0068437, 10-2010-46922, and 10-2010-0059548 disclose a method of wiring of coils using a bus-bar. According to such a conventional bus-bar structure, since an end of each coil should be connected to a connection tab of a bus-bar while a plurality of coils is protruded toward the top of the stator core, it is difficult to do the work.

Specifically, in the case of Korean Patent No. 10-2008-0068437, electrical wiring is performed by inserting an end portion of a coil protruding upward into a coil insertion hole formed in the bus-bar. In this case, since the end portions of some coils which are not inserted generate interference when the end portion of the coil is inserted into the hole, it is very difficult to simultaneously insert a plurality of coil end portions into the holes, respectively. In addition, in the case of Korean Patent Nos. 10-2010-46922 and 10-2010-0059548, the end portions of the coils should be respectively connected to connection tabs of the bus-bar while being protruded toward the top, the work is very difficult to do, and it is possible to connect a coil to a wrong connection tab.

In order to solve these problems, Korean Patent Registration No. 10-1146440 improves workability by bending and aligning two ends of a coil wound around a tooth toward an upper insulator and then positioning the coil at a coil lead unit of a bus-bar housing corresponding to the position of each coil.

However, since Korean Patent Registration No. 10-1146440 requires too many working processes since each end should be cut and wired after winding a coil around each tooth and, in the case of 3-phase parallel wiring, bus-bars for connecting U, V and W phases to a neutral point are concentrated on one bus-bar housing, there is a limit in improving the speed of work.

Therefore, in order to solve the problems described above, inventors of the present invention propose a stator of a motor having a bus-bar wiring structure, which applies a structure enabling parallel wiring by applying a method of sequentially winding one coil around all teeth, and a method of wiring the coil in parallel.

SUMMARY OF THE INVENTION

Therefore, the present invention has been made in view of the above problems, and it is an object of the present invention to provide a stator of a motor having a bus-bar wiring structure of a new type.

Another object of the present invention is to provide a stator of a motor having a bus-bar wiring structure with improved workability.

Still another object of the present invention is to provide a new method of wiring a coil wound around a stator.

The above and other inherent objects of the present invention will be easily accomplished by the present invention described below.

To accomplish the above objects, according to one aspect of the present invention, there is provided a stator of a motor having a bus-bar wiring structure, the stator including: a stator core configured of a core base in which a plurality of teeth is formed; an upper insulator coupled to a top of the stator core to insulate the teeth; a lower insulator coupled to a bottom of the stator core; a coil wound around the teeth when the upper insulator and the lower insulator are coupled; and a lower bus-bar housing coupled to a top of the upper insulator and having a plurality of bus-bar insertion units formed to insert a plurality of bus-bars.

In the present invention, the stator may further include: a neutral point bus-bar insertion unit formed at an outer periphery of the lower insulator; and a neutral point bus-bar inserted into the neutral point bus-bar insertion unit.

In the present invention, a plurality of neutral point coil connection units may be formed in the neutral point bus-bar insertion unit, and some of coils positioned at a lower portion of the teeth may be wired to the neutral point coil connection units.

In the present invention, the stator may further include an upper bus-bar housing coupled to a top of the lower bus-bar housing.

In the present invention, a plurality of power terminal lead units may be formed on an inner side surface of the upper bus-bar housing.

According to one aspect of the present invention, there is provided a method of wiring a coil in parallel around a stator having a plurality of teeth, the method including the steps of: winding the coil around a tooth starting from a top or a bottom of the stator; continuously winding the coil around an adjacent tooth when winding on the tooth is completed; cutting an end portion of the coil positioned at either the top or the bottom of the stator; wiring the cut end portion of the coil using a bus-bar; and wiring a neutral point to the other end of either the top or the bottom of the stator.

DETAILED DESCRIPTION OF THE PREFERRED EMBODIMENT

The preferred embodiments of the invention will be hereafter described in detail, with reference to the accompanying drawings.

Figure 1:
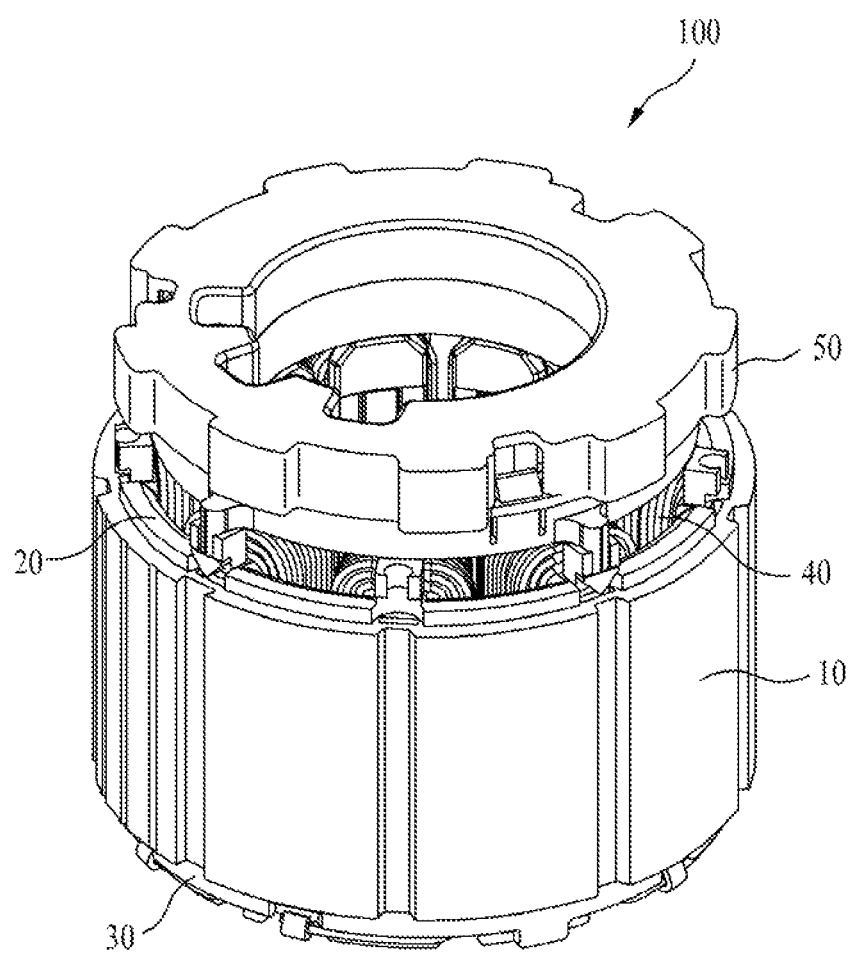
FIG. 1 is a perspective view showing a stator of a motor having a bus-bar wiring structure according to the present invention.

FIG. 1 is a perspective view showing a stator 100 of a motor having a bus-bar wiring structure according to the present invention.

As shown in FIG. 1, a stator 100 of a motor according to the present invention is configured of a stator core 10, an upper insulator 20, a lower insulator 30, a coil 40 and a bus-bar housing 50.

The stator core 10 is generally manufactured in the form of an iron core stacking a plurality of thin iron plates. A detailed configuration of the stator core 10 will be described with reference to FIG. 2.

Figure 2:
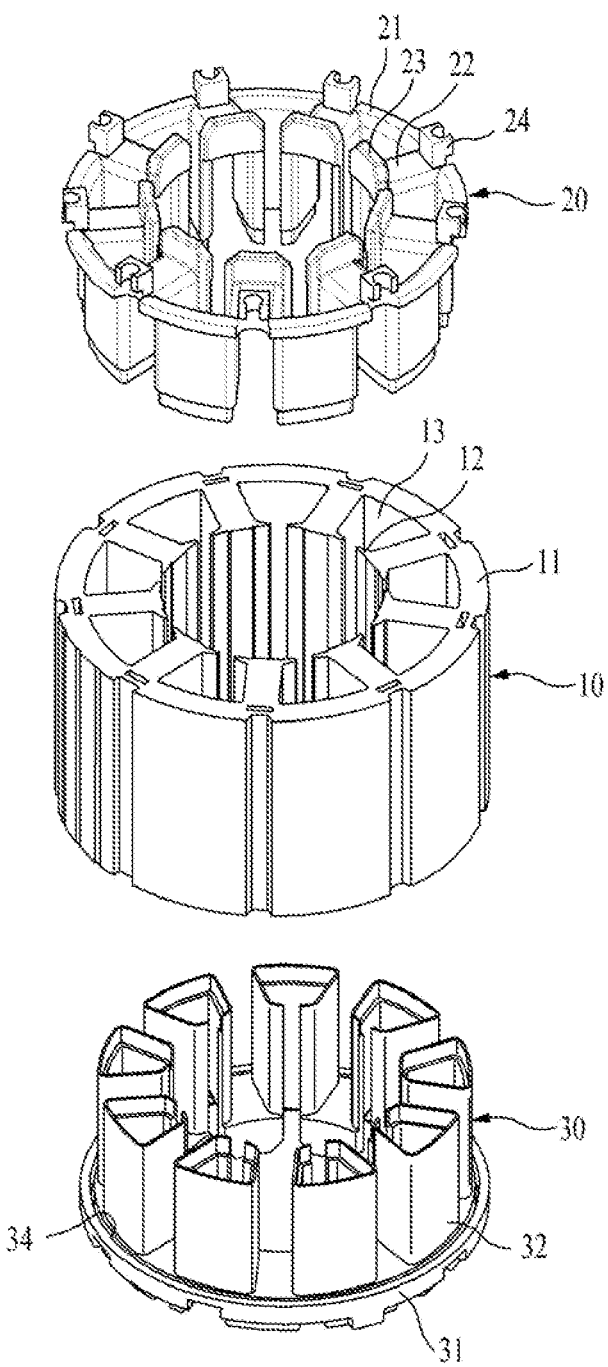
FIG. 2 is an exploded perspective view showing an exploded part of a stator of a motor according to the present invention.

FIG. 2 is an exploded perspective view showing an exploded part of a stator 100 of a motor according to the present invention.

Referring to FIG. 2, the stator core 10 of the present invention is configured of a core base 11 having a shape of a circular ring, a plurality of teeth 12 formed on the inner surface of the core base 11 in a radial shape toward the center, and teeth ears 13 respectively formed at an end of each tooth 12 and slightly extended toward both sides. A rotor (not shown) is positioned toward the inside of the teeth ear 13, i.e., at a position toward the center of the core base 11. That is, since the rotor positions and rotates at the inside of the stator core 10, the stator 100 shown in FIG. 1 is applied to a motor of an inner rotor type. Accordingly, the teeth 12 have a shape formed toward the center of the core base 11, and the present invention is not necessarily limited to such a shape, but the teeth 12 are formed toward the periphery of the core base 11 so as to be applied to a motor of an outer rotor type in which the rotor rotates at the outside of the stator 100, by forming the teeth 12 to be positioned toward the periphery of the core base 11.

Referring to FIGS. 1 and 2, the upper insulator 20 and the lower insulator 30 are coupled to the top and bottom of the stator core 10, respectively. The upper insulator 20 is configured of an outer diameter unit 21, a teeth insulation unit 22, an inner diameter unit 23 and a bus-bar housing connection unit 24. Each of these parts is preferably manufactured using one insulating resin molding.

The outer diameter unit 21 is a part which covers a portion or all of the top and a portion of the inner side surface of the core base 11. The teeth insulation unit 22 is formed toward the inside of the outer diameter unit 21 to wrap the teeth 12. The teeth insulation unit 22 covers the top and side surfaces of the teeth 12 and a portion of the inner side surface of the core base 11. A coil 40 is wound around the teeth insulation unit 22, and the teeth insulation unit 22 performs an insulation function between the inner side surfaces of the coil 40 and the teeth 12 and between the coil 40 and the core base 11. The inner diameter unit 23 covering the top of the teeth ear 13 is formed at an end of the teeth insulation unit 22. The inner diameter unit 23 is formed to be protruded toward the top by a predetermined height to prevent the coil from being protruded toward the inside when the coil 40 is wound. A plurality of bus-bar housing connection units 24 is formed at the outer diameter unit 21. As shown in FIG. 2, the bus-bar housing connection unit 24 may have a shape of a hole for inserting a projection or may have a shape for applying a hook shaped or other well-known connection means.

The lower insulator 30 is coupled to the bottom of the stator core 10, and although the lower insulator 30 has a configuration similar to that of the upper insulator 20, there is a difference. A detailed configuration related thereto will be described below with reference to FIG. 3.

The coil 40 is wound around each of the teeth 12 while the upper insulator 20 and the lower insulator 30 are coupled to the stator core 10. In the present invention, when a thread of the coil 40 completes to be wounded around one of the teeth, it is not cut there and wound around another tooth at an adjacent position, and winding of the coil is completed for all the teeth by sequentially repeating this process. After the winding process like this is completed first, a process for parallel wiring is performed. Therefore, the winding work can be performed using a winding device having only one nozzle. Compared with a conventional parallel wiring, in which when winding a coil around a tooth is completed, the coil is cut and both of the ends of the coil are processed, and in the case of a 3-phase series connection, three teeth are simultaneously wound using three nozzles, the present invention may simplify the winding device.

The stator 100 shown in FIG. 1 has a structure applied to a nine-slot motor and is connected through a 3-phase parallel Y-connection. Of course, the number of slots and phases is not necessarily limited thereto. For the parallel connection, the stator 100 according to the present invention performs wiring of a neutral point at the lower insulator 30 side, and wiring each of three phases is performed at the bus-bar housing 50 coupled to the top of the upper insulator 20. To this end, bus-bars for wiring each phase are installed inside the bus-bar housing 50, and details thereof will be described below.

Figure 3:
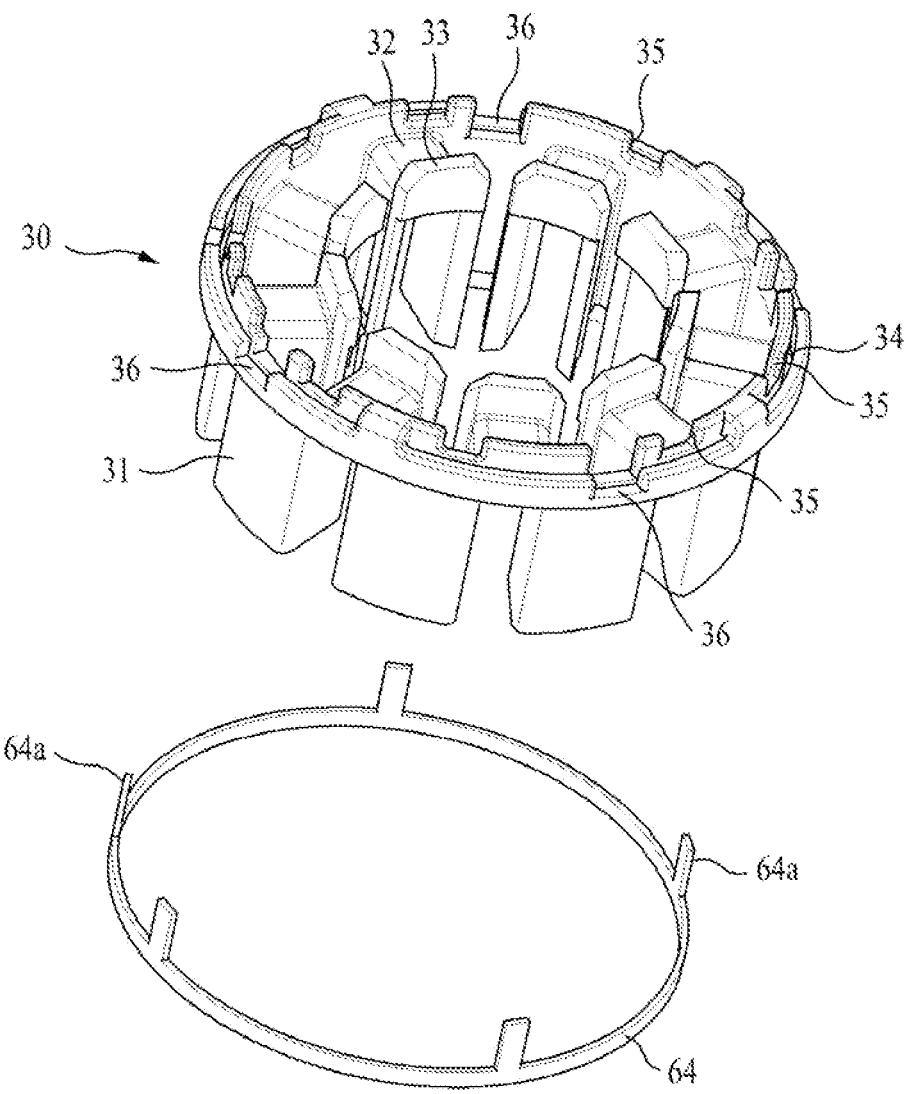
FIG. 3 is a perspective view showing a lower insulator and a neutral point bus-bar of a stator of a motor according to the present invention.

FIG. 3 is a perspective view showing a lower insulator 30 and a neutral point bus-bar 64 of a stator 100 of a motor according to the present invention, from the bottom of the stator.

As shown in FIG. 3, the lower insulator 30 of the present invention is configured of an outer diameter unit 31, a teeth insulation unit 32 and an inner diameter unit 33. The lower insulator 30 is preferably manufactured using an insulating resin molding, like the upper insulator 20. The outer diameter unit 31 covers a portion or all of the bottom and a portion of the inner side surface of the stator core 10. The teeth insulation unit 32 covers the bottom and side surfaces of each tooth 12 and a portion of the inner side surface of the core base 11. The teeth insulation unit 22 of the upper insulator 20 and the teeth insulation unit 32 of the lower insulator 30 are contact and combined with each other so that all the inner side surface of the core base 11 and the top, bottom and inner side surfaces of the teeth 12 may be insulated. The inner diameter unit 33 has a shape slightly protruded upwards at an end of the teeth insulation unit 32.

A neutral point bus-bar insertion unit 34 for inserting a neutral point bus-bar 64 is formed in the outer diameter unit 31. The neutral point bus-bar 64 is shaped in a circular ring having a plurality of neutral point coil connection units 64a. FIG. 3 shows a case of forming five neutral point coil connection units 64a. In the case of parallel wiring, when a coil is wound around a tooth, one end of the coil should be connected to the neutral point, and the other end should be connected to a coil of the same phase and an external power terminal. Since the neutral point bus-bar 64 should be connected to one of two ends of the coil wound around each tooth for all the teeth, the five neutral point coil connection units 64a are formed to wire the ends of the coils wound around nine teeth, i.e., nine coil ends. Since one neutral point coil connection unit 64a may connect one ends of the coils of two adjacent teeth, four coil connection units for connecting one ends of two coils and one coil connection unit for connecting one end of a coil are applied. Of course, although the number of the neutral point coil connection units 64a may be changed diversely, since the length of a coil should be adjusted to connect an end of the coil, in the case of a nine-slot motor, it is preferable to apply five neutral point coil connection units 64a as shown in FIG. 3 and share one coil connection unit 64a by the coils of two adjacent teeth.

Figure 4:
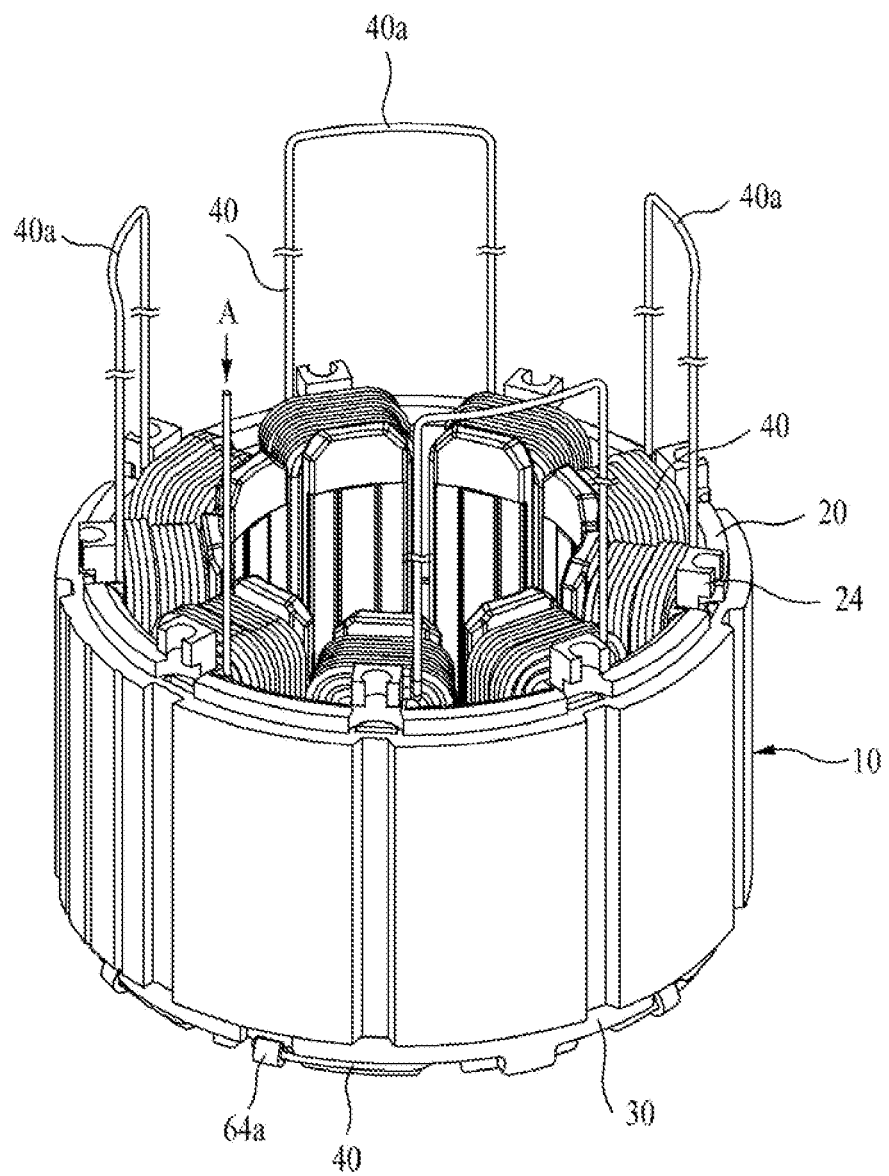
FIG. 4 is a perspective view showing a coil wound around a stator of a motor according to the present invention.
Figure 5:
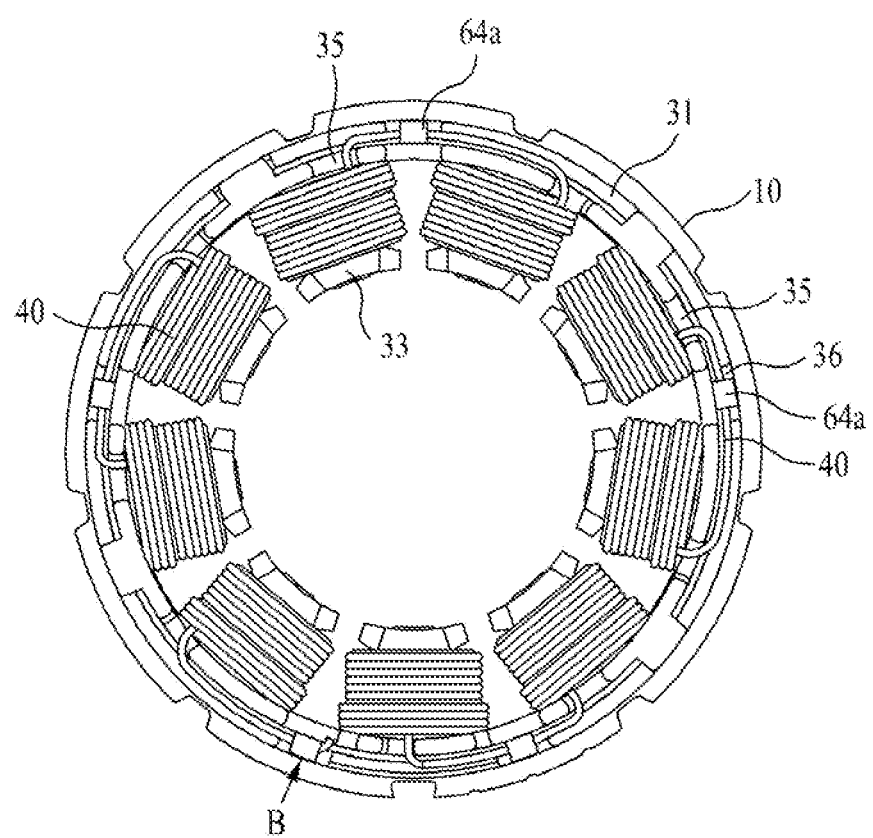
FIG. 5 is a bottom surface view showing a coil wound around a stator of a motor according to the present invention.

FIG. 4 is a perspective view showing a coil 40 wound around a stator 100 of a motor according to the present invention, and FIG. 5 is a bottom surface view thereof.

Referring to FIGS. 4 and 5, when the coil 40 is wound around the stator 100 of the present invention, the coil is wound while the upper insulator 20 and the lower insulator 30 are coupled to the stator core 10. Winding of the coil 40 starts from point A of FIG. 4. That is, when winding on a tooth is completed from the upper insulator 20 side, the coil proceeds toward the lower insulator 30, and winding on an adjacent tooth starts from the lower insulator 30 side. If winding on the adjacent tooth is completed, the coil 40 is positioned at the upper insulator 20 side and proceeds to an adjacent tooth. A view of winding that is sequentially completed on adjacent teeth is shown in FIG. 4. The coil protruded toward the top has a form connecting two adjacent teeth, and this connected portion is cut and discarded as a scarp 40a, and then the end of each coil is wired to a bus-bar corresponding to each phase of the bus-bar housing 50.

Wiring of the neural point is accomplished by the neutral point bus-bar 64 coupled to the lower insulator 30. Referring to FIG. 5, if winding of the coil 40 sequentially proceeds toward an adjacent tooth, the winding is completed at point B. Of course, the winding may start from point B and complete at point A of FIG. 4. The coils wound around two adjacent teeth are wired by the neutral point coil connection unit 64a of the neutral point bus-bar 64, and the coil wound around the last one tooth is wired to the neutral point coil connection unit 64a positioned at point B. Therefore, one of two ends of each of the coils wound around the nine teeth is electrically connected to one of two ends of another coil. For the electrical connection and physical coupling of the neutral point coil connection unit 64a and the coil 40, it is preferable to bend the neutral point coil connection unit 64a and then apply fusing welding.

Wiring of the neutral point is accomplished by the neutral point bus-bar 64 coupled to the lower insulator 30 as described above. Wiring of each phase is accomplished by the bus-bar of the bus-bar housing 50 coupled to the upper insulator 20, and this will be described in detail with reference to FIGS. 6 and 7.

Figure 6:
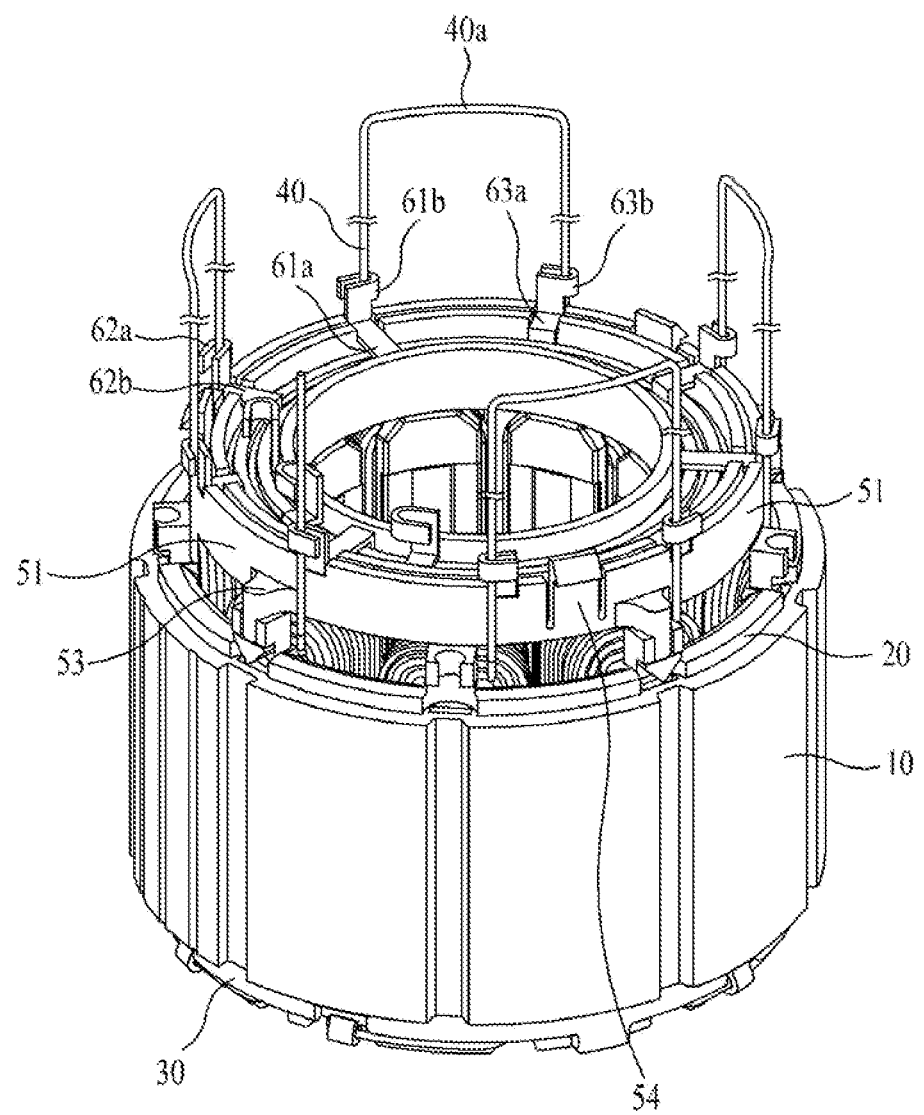
FIG. 6 is a perspective view showing bus-bar wiring performed at a stator of a motor according to the present invention.
Figure 7:
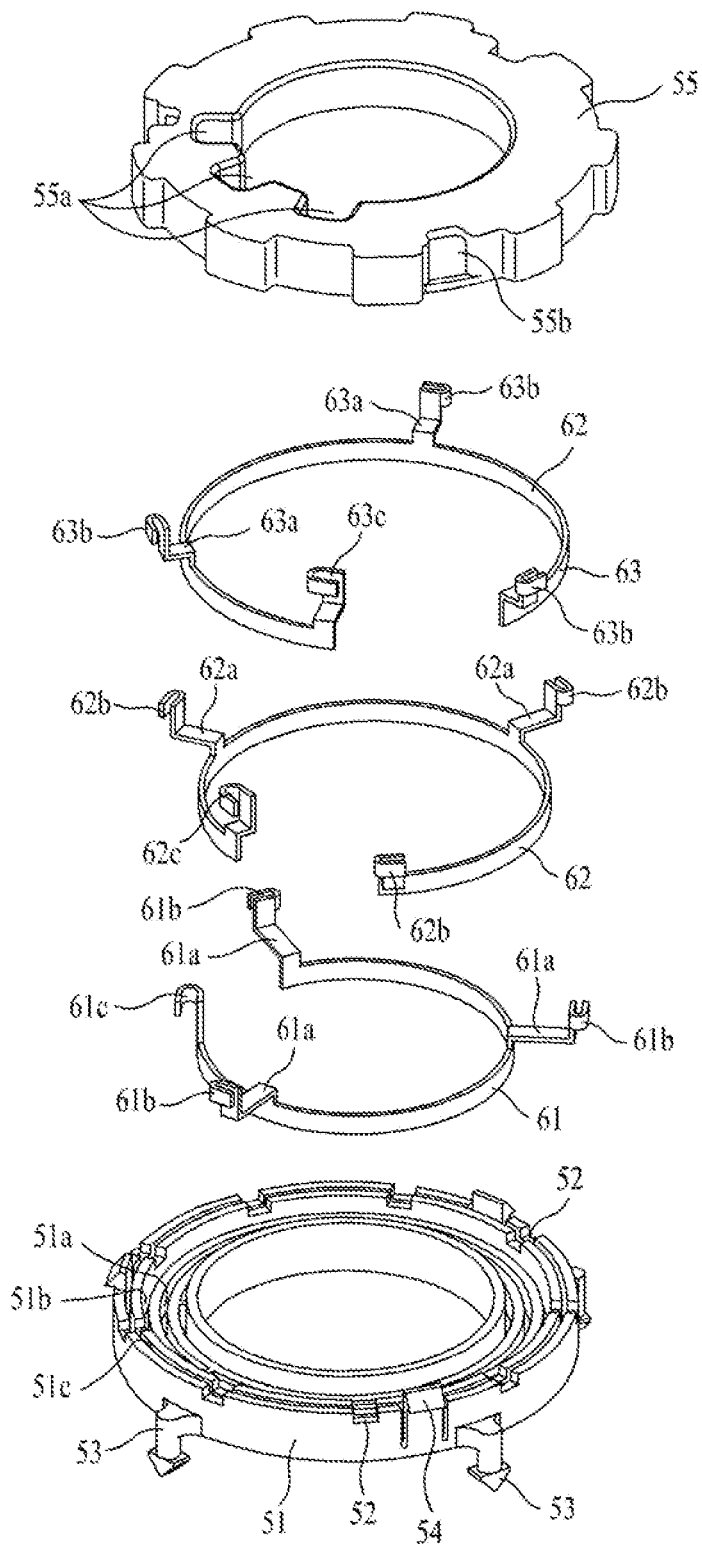
FIG. 7 is an exploded perspective view showing an exploded bus-bar housing applied to a stator of a motor according to the present invention.

FIG. 6 is a perspective view showing bus-bar wiring performed at a stator 100 of a motor according to the present invention, and FIG. 7 is an exploded perspective view showing an exploded bus-bar housing 50.

As shown in FIGS. 6 and 7, the bus-bar housing 50 has a structure of combining a lower bus-bar housing 51 and an upper bus-bar housing 52.

A first bus-bar insertion unit 51a, a second bus-bar insertion unit 51b and a third bus-bar insertion unit 51c for inserting a bus-bar for wiring three phases are formed inside the lower bus-bar housing 51. These three bus-bars are for wiring u, v and w phases, i.e., each of three phases, and various numbers of bus-bars other than the three bus-bars can be applied according to the number of phases.

A first bus-bar 61 is for wiring one of three phases, for example, the u phase, and a coil wound around three teeth corresponding to the u phase among the nine teeth is wired to the first bus-bar 61. Accordingly, three first coil connection units 61b are formed in the first bus-bar 61, and each of the first coil connection units 61b is extended by a first outer diameter extension unit 61a formed toward the outer diameter. When the first bus-bar 61 is inserted into the first bus-bar insertion unit 51a, the first outer diameter extension unit 61a is rested on a resting unit at a position corresponding to the first outer diameter extension unit 61a among a plurality of resting units 52 formed in the lower bus-bar housing 51. An end of the coil 40 is electrically connected to the first coil connection unit 61b, and although a variety of methods such as soldering, compressing, welding and the like can be applied as a connection method, the electrical and physical connection is preferably accomplished by fusing welding. A first power connection unit 61c is separately formed in the first bus-bar 61, and the first bus-bar 61 is electrically connected to an external power through the first power connection unit 61c.

A second bus-bar 62 is for wiring one of three phases, for example, the v phase, and a coil wound around three teeth corresponding to the v phase among the nine teeth is wired to the second bus-bar 62. Accordingly, three second coil connection units 62b are formed in the second bus-bar 62, and each of the second coil connection units 62b is extended by a second outer diameter extension unit 62a formed toward the outer diameter. When the second bus-bar 62 is inserted into the second bus-bar insertion unit 51b, the second outer diameter extension unit 62a is positioned at a resting unit formed at a position corresponding to the second outer diameter extension unit 62a among the plurality of resting units 52 formed in the lower bus-bar housing 51. An end of the coil 40 is electrically connected to the second coil connection unit 62b, and although a variety of methods such as soldering, compressing, welding and the like can be applied as a connection method, preferably, the electrical and physical connection is accomplished by fusing welding. A second power connection unit 62c is separately formed in the second bus-bar 62, and the second bus-bar 62 is electrically connected to an external power through the second power connection unit 62c.

A third bus-bar 63 is for wiring one of three phases, for example, the w phase, and a coil wound around three teeth corresponding to the w phase among the nine teeth is wired to the third bus-bar 63. Accordingly, three third coil connection units 63b are formed in the third bus-bar 63, and each of the third coil connection units 63b is extended by a third outer diameter extension unit 63a formed toward the outer diameter. When the third bus-bar 63 is inserted in the third bus-bar insertion unit 51c, the third outer diameter extension unit 63a is placed at a resting unit formed at a position corresponding to the third outer diameter extension unit 63a among the plurality of resting units 52 formed in the lower bus-bar housing 51. An end of the coil 40 is electrically connected to the third coil connection unit 63b, and although a variety of methods such as soldering, compressing, welding and the like can be applied as a connection method, preferably, the electrical and physical connection is accomplished by fusing welding. A third power connection unit 63c is separately formed in the third bus-bar 63, and the third bus-bar 63 is electrically connected to an external power through the third power connection unit 63c.

A plurality of housing fixing units 53 is formed on the outer side surface of the lower bus-bar housing 51 or toward the bottom. For the housing fixing unit 53, a shape of a latching projection may be applied as shown in FIG. 7, or a variety of shapes may be applied according to the shape of the bus-bar housing connection unit 24 formed in the upper insulator 20.

A plurality of upper housing fixing units 54 is formed on the outer side surface of the lower bus-bar housing 51 or toward the top. For the upper housing fixing unit 54, a shape of a hook may be applied as shown in FIG. 7, or a variety of other coupling structures may be applied. The upper housing fixing units 54 are inserted into coupling grooves 55b formed in the upper bus-bar housing 55.

The upper bus-bar housing 55 is combined with the lower bus-bar housing 51 and performs a function of protecting the bus-bars and the like coupled inside the lower bus-bar housing 51 from outside. A plurality of power terminal lead units 55a is formed on the inner side surface of the upper bus-bar housing 55, and the power terminal lead unit 55a provides a space for electrically connecting an external power to each bus-bar.

Figure 8:
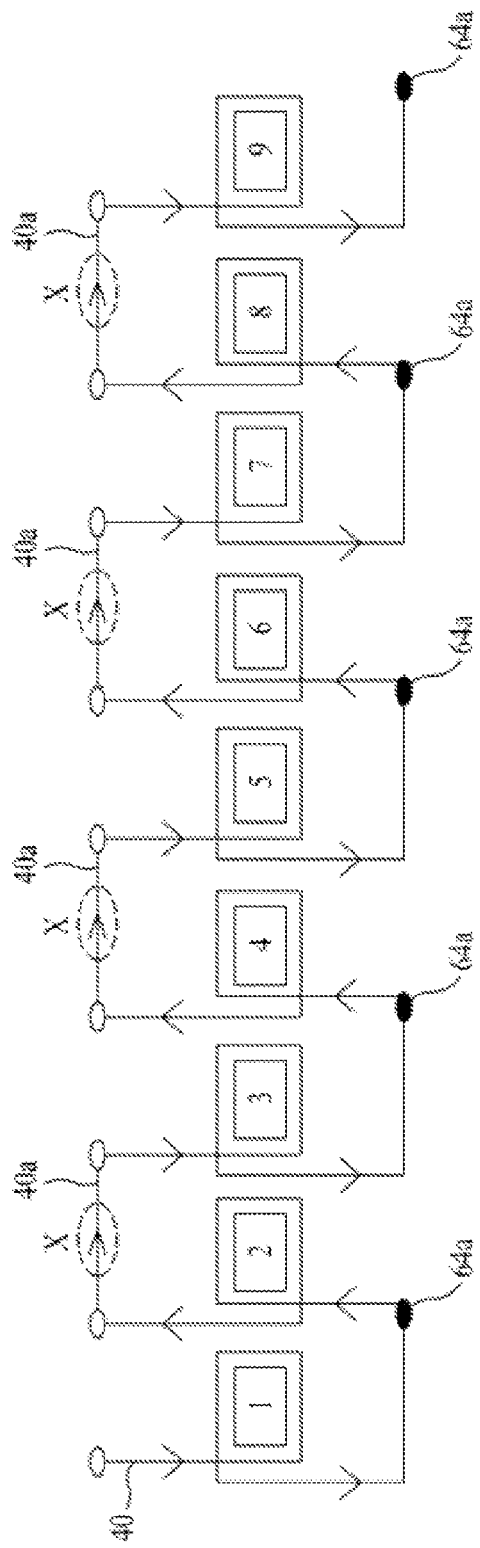
FIG. 8 shows a pattern diagram of a coil wound around a stator of a motor according to the present invention.

FIG. 8 shows a parallel wiring pattern diagram of a coil 40 wound around a stator 100 of a motor according to the present invention.

As shown in FIG. 8, in the case of a nine-slot motor, winding of the coil 40 starts from point A placed at the upper portion of the stator 100. When winding on a first tooth is completed first, the coil moves to a second tooth adjacent at the lower portion of the stator 100 and is wound around the second tooth starting from the lower portion. When winding on the second tooth is completed, winding of the coil starts from the upper portion of a third tooth adjacent at the upper portion of the stator 100. If these steps are repeated and winding is completed up to the ninth tooth, the winding is completed at point B placed at the lower portion of the stator 100. Like this, after winding one coil around the first to ninth teeth at a time without cutting the coil in the middle, X portions of the coil connecting two adjacent teeth on the top of the stator 100 are cut, and the scraps 40a, which are cut portions, are removed. Then, the coils positioning at the lower portion of the stator 100 are wired to the neutral point coil connection units 64a, respectively. Of course, wiring of the neutral point coils may be performed before the coils positioned at the top of the stator 100 are cut.

Figure 9:
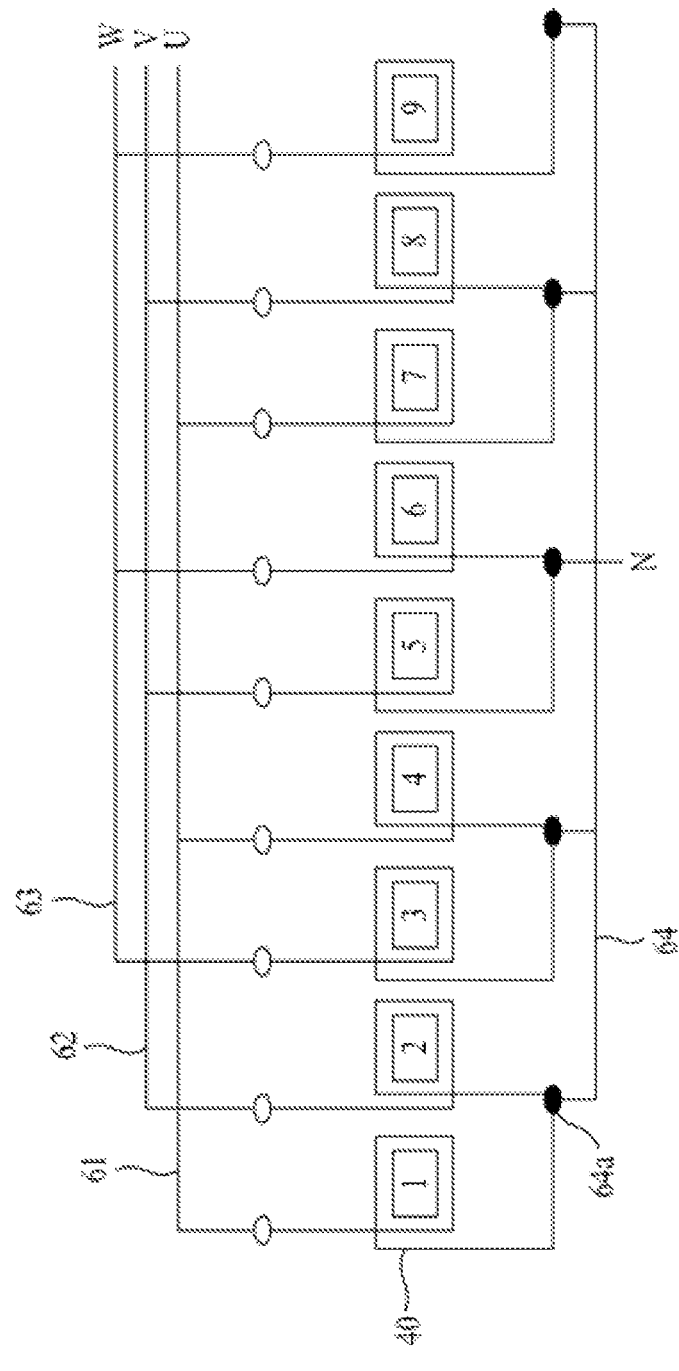
FIG. 9 shows a pattern diagram when a coil wound around a stator of a motor is wired to bus-bars according to the present invention.

FIG. 9 shows a pattern diagram when a coil wound around a stator 100 of a motor is wired to bus-bars 61, 62, 63 and 64 according to the present invention.

As shown in FIG. 8, when winding and cutting of the coil is completed, the neutral point on the bottom of the stator 100 is in a state being wired as described above with reference to FIG. 8. Referring to FIG. 9 to describe the steps performed thereafter, while winding of the coil has already been completed, the first bus-bar 61 is wired to the coils of the first, fourth and seventh teeth to connect the u phase. In the same manner, the second bus-bar 62 is wired to the coils of the second, fifth and eighth teeth to connect the v phase, and the third bus-bar 63 is wired to the coils of the third, sixth and ninth teeth to connect the w phase. The other end of each bus-bar is electrically connected to an external power.

In FIGS. 8 and 9, although each phase is wired using a bus-bar at the top of the stator 100 and a neutral point is wired at the bottom of the stator 100, contrarily, the neutral point may be wired at the top of the stator 100 and each phase may be wired using the bus-bar at the bottom of the stator 100 according to the structure of a motor.

The present invention has an effect of providing a stator of a motor having a bus-bar wiring structure to improve workability through a bus-bar wiring structure of a new type and providing a new method of wiring a coil wound around a stator.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A stator of a motor comprising:
    a stator core configured of a core base in which a plurality of teeth is formed;
    an upper insulator coupled to a top of the stator core to insulate the teeth;
    a lower insulator coupled to a bottom of the stator core;
    a coil wound around the teeth when the upper insulator and the lower insulator are coupled;
    a lower bus-bar housing coupled to a top of the upper insulator and having a plurality of bus-bar insertion units formed to insert a plurality of bus-bars;
    a neutral point bus-bar insertion unit formed at an outer periphery of the lower insulator; and
    a neutral point bus-bar inserted into the neutral point bus-bar insertion unit.

2. The stator according to claim 1, wherein a plurality of neutral point coil connection units is formed in the neutral point bus-bar insertion unit, and some of coils positioned at a lower portion of the teeth are wired to the neutral point coil connection units.

3. The stator according to claim 1, further comprising an upper bus-bar housing coupled to a top of the lower bus-bar housing.

4. The stator according to claim 3, wherein a plurality of power terminal lead units is formed on an inner side surface of the upper bus-bar housing.

* * * * *